(12) United States Patent
Orth

(10) Patent No.: US 10,929,802 B2
(45) Date of Patent: Feb. 23, 2021

(54) METHOD FOR OPENING A DOOR OF A DELIVERY VAN

(71) Applicant: Deutsche Post AG, Bonn (DE)

(72) Inventor: Felix Orth, Aachen (DE)

(73) Assignee: DEUTSCHE POST AG, Bonn (DE)

( * ) Notice: Subject to any disclaimer, the term of this patent is extended or adjusted under 35 U.S.C. 154(b) by 0 days.

(21) Appl. No.: 16/360,209

(22) Filed: Mar. 21, 2019

(65) Prior Publication Data

US 2019/0295028 A1    Sep. 26, 2019

(30) Foreign Application Priority Data

Mar. 21, 2018  (DE) ................... 10 2018 106 650.3

(51) Int. Cl.
```
G06Q 10/08     (2012.01)
B60P 1/64      (2006.01)
G06Q 50/28     (2012.01)
```
(52) U.S. Cl.
CPC .......... *G06Q 10/083* (2013.01); *B60P 1/6418* (2013.01); *G06Q 10/087* (2013.01); *G06Q 50/28* (2013.01)

(58) Field of Classification Search
CPC ...... G06Q 10/083; G06Q 50/28; B60P 1/6418
USPC .......................................................... 414/801
See application file for complete search history.

(56) References Cited

U.S. PATENT DOCUMENTS

| | | | | |
|---|---|---|---|---|
| 7,344,037 | B1* | 3/2008 | Zakula, Sr. | B66C 13/46 212/270 |
| 9,552,564 | B1 | 1/2017 | Martenis | |
| 9,846,086 | B1* | 12/2017 | Robinson | G01K 3/04 |
| 2003/0190057 | A1* | 10/2003 | Takehara | B66C 19/007 382/104 |

(Continued)

FOREIGN PATENT DOCUMENTS

| | | |
|---|---|---|
| DE | 102008010086 A1 | 8/2009 |
| DE | 102016009702 A1 | 2/2017 |

(Continued)

OTHER PUBLICATIONS

"Up Close with Ram's New ProMaster City Van"; Dec. 22, 2014; www.truckinginfo.com; pp. 1-8 (Year: 2014).*

(Continued)

*Primary Examiner* — Lynn E Schwenning
(74) *Attorney, Agent, or Firm* — Dority & Manning, P.A.

(57) ABSTRACT

A method for locating at least one object transported in a load compartment of a delivery van, wherein the load compartment has a plurality of doors for removing the at least one object from the load compartment and the delivery van has a controller, includes determining a current position of the at least one object in the load compartment during a journey of the delivery van with a position determination device communicatively connected to the controller, and, for removing the at least one object from the load compartment, determining that door from the plurality of doors with the shortest distance to the current position, indicating the determined door with an indication device communicatively (Continued)

connected to the controller and/or opening the determined door and indicating the current position of the at least one object in the load compartment with the indication device.

17 Claims, 2 Drawing Sheets

(56) References Cited

U.S. PATENT DOCUMENTS

| | | | |
|---|---|---|---|
| 2007/0222674 A1* | 9/2007 | Tan | G01S 19/49 342/357.32 |
| 2008/0018475 A1 | 1/2008 | Breed et al. | |
| 2009/0187272 A1* | 7/2009 | Perez | B07C 3/14 700/227 |
| 2011/0068954 A1* | 3/2011 | McQuade | G06F 16/955 340/988 |
| 2012/0283868 A1* | 11/2012 | Rutt | G06Q 10/083 700/217 |
| 2013/0073428 A1* | 3/2013 | Thramann | G06Q 30/00 705/26.9 |
| 2015/0006005 A1 | 1/2015 | Yu et al. | |
| 2016/0189087 A1* | 6/2016 | Morton | G06Q 10/083 705/337 |
| 2016/0238374 A1 | 8/2016 | Burch, V et al. | |
| 2017/0132561 A1* | 5/2017 | High | G06Q 10/0832 |
| 2017/0293885 A1 | 10/2017 | Grady et al. | |
| 2018/0111698 A1* | 4/2018 | Podnar | G06Q 50/28 |
| 2019/0098263 A1* | 3/2019 | Seiger | G06Q 10/0833 |
| 2019/0114577 A1* | 4/2019 | Kilburn | G06Q 50/28 |
| 2019/0152376 A1* | 5/2019 | Schwartz | G06Q 10/087 |

FOREIGN PATENT DOCUMENTS

| | | |
|---|---|---|
| EP | 3171307 A1 | 5/2017 |
| EP | 3190567 A1 | 7/2017 |

OTHER PUBLICATIONS

"Electric Vehicles"; www.workhorse.com, pp. 1-11 (Year: 2012).*
German Office Action DE102018106650.3, dated Feb. 7, 2019. (16 pages).
European Office Action 19164008.5-1222, dated Jun. 29, 2020. (6 pages).

* cited by examiner

METHOD FOR OPENING A DOOR OF A DELIVERY VAN

CROSS-REFERENCE TO PRIORITY APPLICATION

This application is related and claims priority to DE 10 2018 106 650.3, which is incorporated by reference in its entirety for all purposes.

TECHNICAL FIELD

The invention relates to a method for locating at least one object transported in a load compartment of a delivery van, wherein the load compartment has a plurality of doors for removing the at least one object from the load compartment, and the delivery van has a controller. The invention also relates to a delivery van having a load compartment for transporting at least one object and also having a controller.

BACKGROUND OF THE INVENTION

Electric vehicles have been used for some time as delivery vans for conveying objects, for example parcels, letters or other transportable goods. A load compartment in which the objects are transported is provided behind a driver's cab of the delivery van. The electric vehicles are generally provided only with the most necessary devices in order to maximize the range which is dependent on the weight of the electric vehicle. In this respect, a shelving system is often dispensed with in the load compartment, with the result that the objects are placed on a load surface as the base of the load compartment.

As a result of the inertial forces which occur during cornering of the delivery van, the objects may slip in the load compartment. An object placed at a right-hand side door of the load compartment may come to rest at a left-hand side door of the load compartment after a few driving manoeuvres. Accordingly, searching and finding an object to be removed from the load compartment may take an unnecessarily large amount of time. Since the load compartment is usually loaded with dozens or even hundreds of objects to be delivered, such searching for the objects to be unloaded in succession along a route of the delivery van may amount to a considerable loss of time and may result in significant additional costs.

DESCRIPTION OF THE INVENTION

On the basis of this situation, an object of the present invention is to specify a method and a corresponding delivery van in order to be able to easily locate objects transported in a load compartment of the delivery van without time-consuming searching.

Accordingly, the object is achieved by a method for locating at least one object transported in a load compartment of a delivery van, wherein the load compartment has a plurality of doors for removing the at least one object from the load compartment, and the delivery van has a controller, the method includes: determining a current position of at least one object in the load compartment during a journey of the delivery van by a position determination device communicatively connected to the controller; and, for removing the at least one object from the load compartment, determining that door from the plurality of doors with the shortest distance to the current position, indicating the determined door by an indication device communicatively connected to the controller and/or opening the determined door and indicating the current position of the at least one object in the load compartment with the indication apparatus communicatively connected to the controller.

According to one preferred development, the method includes loading the load compartment with a plurality of objects, and determining the current position of all objects in the load compartment during the journey of the delivery van with the position determination device communicatively connected to the controller.

The object is also achieved by a delivery van having a load compartment for transporting at least one object, having a controller, a position determination device which is communicatively connected to the controller and is configured to determine a current position of the at least one object in the load compartment during a journey of the delivery van, and an indication device communicatively connected to the controller, wherein the load compartment has a plurality of doors for removing the at least one object from the load compartment, the controller, for removing the at least one object from the load compartment, is configured to determine that door from the plurality of doors with the shortest distance to the current position of the at least one object, to control the indication device to indicate the determined door and/or to cause opening of the determined door and to control the indication device to indicate the current position of the at least one object in the load compartment.

An important point of the invention is that the respective current position of the at least one object in the load compartment is tracked during the journey of the delivery van. The position determination device respectively determines or tracks the current position irrespective of whether the at least one object slips, for example, owing to inertial forces occurring during cornering, as a result of acceleration or braking, and changes its position in the load compartment in this way. If one door of the plurality of doors is now intended to be opened in order to remove the at least one object from the load compartment, that door from the plurality of doors with the shortest distance to the current position of the at least one object is determined and the determined door is indicated or opened. In addition, the current position of the at least one object to be removed is indicated.

As a result, the door through which a delivery agent can most easily reach the at least one object to be removed and where the at least one object to be removed can be found in the load compartment is signalled to the delivery agent. The measures described above therefore avoid, in a particularly advantageous manner, unnecessary searching for the at least one object to be removed in the load compartment and unnecessary redundant movements when opening different doors. The proposed method and the delivery van achieve a significant time saving during delivery operation when delivering shipments as objects since the time which is otherwise needed in the prior art to manually search for the objects in the load compartment, which have often slipped as a result of cornering, acceleration or braking, and to find a door suitable for removing the objects is completely dispensed with. This is because the delivery agent is provided with an indication of the door which is to be opened and through which the object can be most easily removed from the load compartment with the indication device. In this respect, the shortest distance between the door to be opened and the current position is determined by the door through which the delivery agent can reach the object particularly well and can remove it from the load compartment. The shortest distance is preferably determined using the linear distance between the respective object and the door.

In addition, incorrect deliveries of objects are prevented by the proposed method and the delivery van. This is because the problem of the delivery agent who removes the at least one object removing an incorrect object from the load compartment, as often occurs in the prior art, is reduced by indicating the current position of the object to be removed. Furthermore, the method and the delivery van enable so-called "chaotic storage" of the objects in the load compartment without a fixed order since the individual objects can be removed from the load compartment promptly and in an easily locatable manner without complicated searching with the position determination device and the indication device. In addition, the method and the delivery van make it possible for the indication device to provide suggestions when loading objects into the load compartment, with the result that the packing density of the objects can be increased and transport damage can be reduced, for example when loading according to weight. Suggestions can likewise be provided by the indication device in the event of overloading of the vehicle. The position determination device and the indication device may be separate or in one piece.

The delivery van can be configured in different ways, in which case a car or a heavy goods vehicle is likewise concomitantly included as the delivery van. The delivery van preferably has a driver's cab behind which the load compartment is arranged. The delivery van is preferably in the form of a delivery vehicle for conveying objects between a logistics centre, a warehouse, a store and/or a distribution centre and recipients or senders of the objects, for example. The recipients or senders of the objects may be persons, packing stations and/or abovementioned logistics centres, warehouses, stores or distribution centres. The delivery van can be used in a personified manner by a delivery agent along a predefined or self-compiled route in order to convey the objects to one or more destinations and/or pick up the objects at said destinations. The delivery van may likewise autonomously cover a predefined or self-compiled route and can independently stop at one or more destinations at which the at least one object can be removed from the load compartment.

The load compartment may be in the form of an open load surface with side doors and/or flaps. The load compartment can particularly preferably be completely closed with respect to external influences, in particular weather influences, by the doors, with the result that unauthorized third parties have no access to the objects transported in the load compartment. More preferably, the load compartment has a cuboidal volume and/or the load compartment is provided with a rectangular base area as a load surface and/or a base on which the objects can be placed beside one another and/or above one another. The useful volume of the load compartment may be, for example, $\geq 4$, $\geq 8$ or $\geq 20$ m$^3$, with the result that objects having a weight of, for example, 650 kg, 1000 kg or 1350 kg can be transported as the payload.

The object may be any desired transportable article, in particular a goods item, an item of piece goods and/or a shipment. The object may include everyday necessities, for example consumables or food, and technical articles or equipment. Shipments, for example letters, parcels and/or printed products such as leaflets, brochures or magazines, may likewise be included.

According to one preferred development of the method and/or the delivery van, the indication of the determined door and/or the indication of the current position of the at least one object in the load compartment may include one or more of an acoustic, haptic and/or visual signal, a presentation on a display of the delivery van and/or of a mobile communication device and/or a presentation of the current position of the at least one object and/or of the door by projecting a light beam, in particular a laser beam, onto the at least one object and/or the door. The indication therefore includes not only a visual signal but may likewise be effected by an acoustic and/or haptic signal.

For example, after the delivery van has been parked for the purpose of delivering an object, the ability to reach the object to be removed from the load compartment through a left-hand side door, a right-hand side door or a tailgate is indicated to the delivery agent by a first signal. The delivery agent therefore no longer has to open individual doors and/or flaps of the delivery van in succession until the delivery agent can reach the object to be removed. In addition, the delivery agent is informed of the current position of the object to be removed by a second signal. The indication of the determined door and the indication of the current position of the at least one object can also be effected together on a display of the delivery van which is provided in the driver's cab or in the load compartment, for example. The presentation can also be effected on a mobile communication device, for example on a smartphone or a mobile terminal belonging to the delivery agent, which is used by the latter to scan the objects when loading and/or unloading them from the delivery van.

The presentation can be effected in a two-dimensional or three-dimensional image of the load compartment in which the current position of the object and the door to be opened are highlighted, for example are presented in a framed manner and/or in another colour. The current position is particularly preferably presented by a light beam which is projected onto the object and/or the door. For this purpose, a laser may be arranged on a ceiling of the load compartment, the laser beam from which laser is aimed at the current position and therefore at the object or the door. Mirrors which are pivotably arranged at the laser can be provided for the purpose of deflecting the beam.

According to one preferred development of the method and/or the delivery van, the indication of the current position of the at least one object in the load compartment includes a presentation of a bounding volume around the at least one object. The current position of the at least one object can be visualized in a manner which can be particularly easily discerned by a delivery agent by the bounding volume, for example by a light and/or laser beam. The current position of the at least one object can likewise be presented on a display of the delivery van as a bounding volume, also called a bounding box. An image of the contours of all objects in the load compartment can be presented on the display as respective two-dimensional or three-dimensional bounding volumes, wherein the object to be removed is singled out in terms of colour, for example, with respect to the other objects, which results in the object being found particularly easily in the load compartment. The proposed method and/or the delivery van can also be developed in such a manner that the current position of the object to be removed is automatically indicated by the light beam as a result of a door of the delivery van being opened.

As already previously addressed, one preferred development of the method and/or of the delivery van provides for the plurality of doors to include a left-hand side door, a right-hand side door, a left-hand sliding door, a right-hand sliding door and/or a tailgate of the load compartment. An indication in the form of a display, on which the current position of the object to be removed is visualized, can be provided on the respective door. In order to open the particular door, which is caused by the controller, the respective door is expediently provided with an electromechanical drive. If, according to one exemplary configuration, the delivery agent reaches a delivery location for the object to be delivered, the current position of the object to be delivered and that door of the load compartment which is to be used to remove the object are indicated on a display in the dashboard of the driver's cab, the door to be used is automatically opened and the indication device indicates the position of the object to be delivered in the load compartment and/or a light beam is aimed at the object.

According to another preferred development of the method and/or of the delivery van, the position determination device includes a camera and/or a laser scanner. The position determination device is preferably configured to determine the current position of the at least one object, in particular all objects, in the load compartment on the basis of a size, a weight, a barcode, a loading list of the objects loaded into the delivery van and/or a delivery route of the delivery van. When loading the delivery van at the logistics centre, information relating to the size, the weight and/or barcodes of the objects loaded into the delivery van and/or the delivery route can be transmitted to the delivery van. The controller which is implemented, in particular, in a microprocessor-based and/or computer-based manner may have, for this purpose, a database which stores the abovementioned information. The objects captured by the camera and/or the laser scanner can be uniquely assigned by comparing the objects captured by the position determination device with stored information and/or obtained information, for example from a loading list, in order to track the respective current position in the load compartment.

For example, the position determination device may be configured, during loading and/or unloading, to capture the objects in terms of their size, their weight, their volume, their storage location in the load compartment and/or barcodes provided on the objects and to track the objects captured in this manner with respect to their respective current position in the load compartment during the journey of the delivery van. In this context, it is particularly preferred that the position determination device is configured to determine an identification data record, in particular in the form of a barcode provided on the at least one object. The identification data record can be determined by the camera and/or the laser scanner, as a result of which the at least one object can be uniquely assigned. The position determination device is preferably configured to determine the position of all objects loaded into the load compartment during the journey.

There are fundamentally different possibilities for configuring the load compartment. According to one preferred development of the method and/or of the delivery van, the load compartment is designed without shelves. According to yet another preferred development of the method and/or of the delivery van, the delivery van is in the form of an electric vehicle and/or does not have an internal combustion engine. On account of limited ranges and/or battery capacities which are needed to drive electric vehicles but are limited, the general aim is to keep the dead weight of electric vehicles as low as possible in order to be able to transport as much payload as possible. Although weight which is otherwise needed for a shelf is saved as a result of the configuration of the load compartment without shelves, the objects must be arranged on the base of the load compartment beside one another and/or above one another in so-called chaotic storage. Despite the omission of the shelves, the proposed method and the proposed delivery van make it possible to sort the transported objects to the effect that the respective current position of the objects is tracked by the position determination device and is presented by the indication device, with the result that there is no need to manually search for an object to be removed.

BRIEF DESCRIPTION OF THE DRAWINGS

The invention is explained in more detail below with reference to the enclosed drawings and on the basis of a preferred exemplary embodiment.

In the drawings.

DETAILED DESCRIPTION OF THE EXEMPLARY EMBODIMENTS

Figure 1:
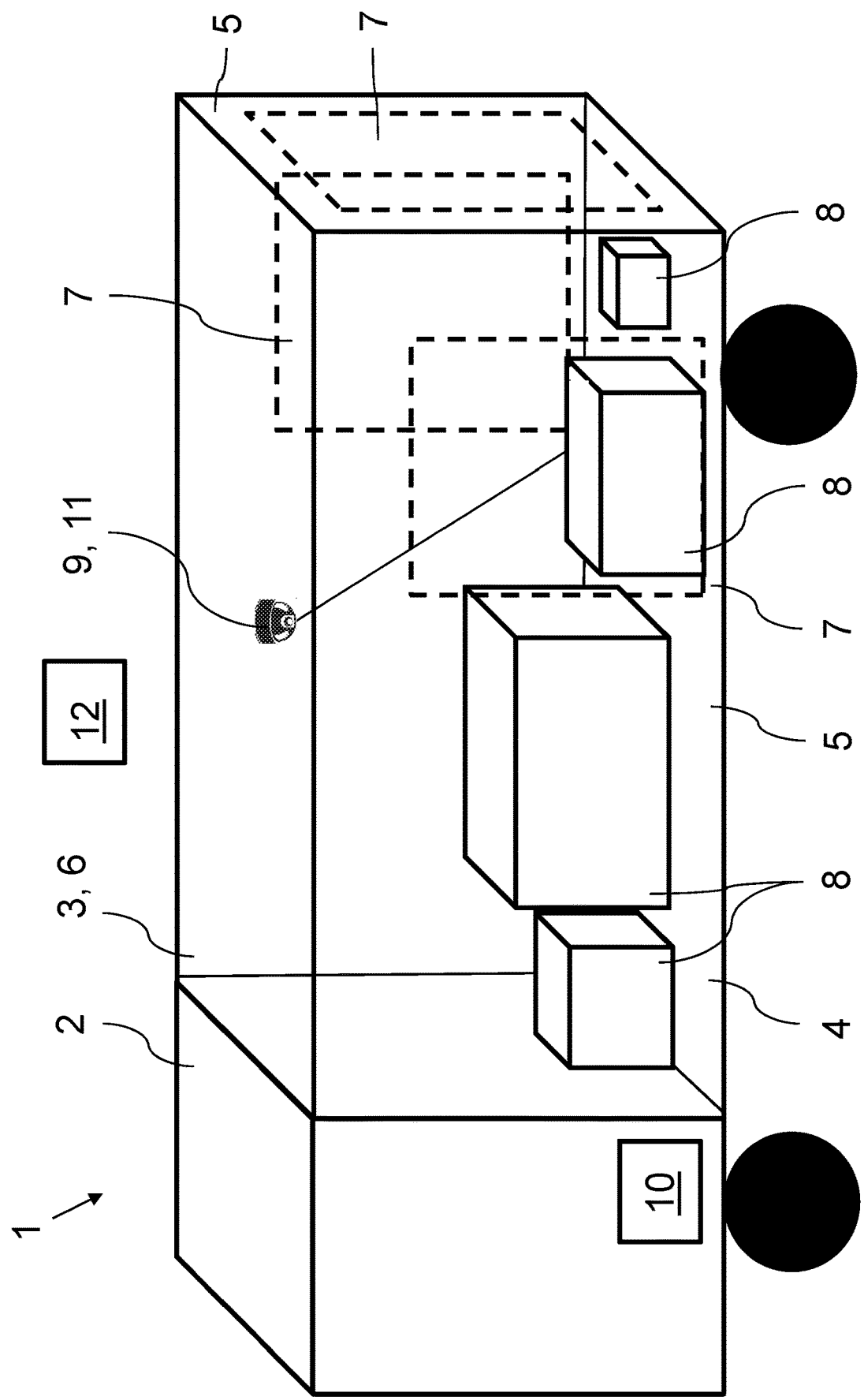
FIG. 1 shows a schematic-perspective view of a delivery van according to one preferred exemplary embodiment of the invention.
Figure 2:
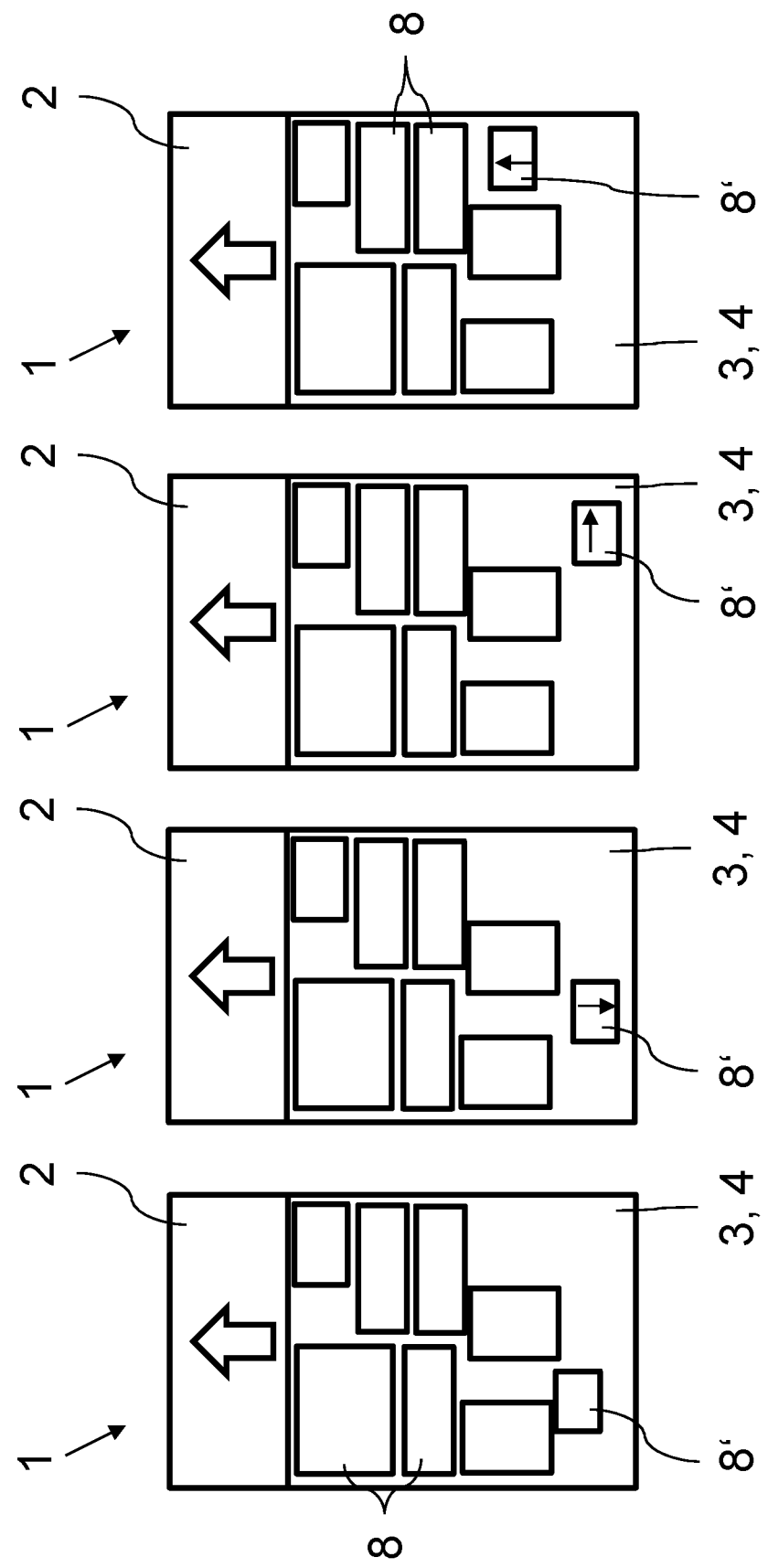
FIG. 2 shows a schematic plan view of the delivery van according to FIG. 1 in various states before, during and after cornering.

FIG. 1 shows a schematic-perspective view of a delivery van 1 according to one preferred exemplary embodiment of the invention, whereas FIG. 2 shows the delivery van 1 according to FIG. 1 in a plurality of schematic plan views before, during and after cornering.

The delivery van 1 is in the form of an electric vehicle without an internal combustion engine and has a driver's cab 2 with a load compartment 3 arranged behind the latter. The load compartment 3 is bounded by a load surface 4, side walls 5 and a ceiling wall 6 and in this manner forms a cuboidal closed interior. A plurality of closable doors 7, indicated by dashed lines 7, through which the interior can be reached, are provided in the side walls 5. In the present case, the load compartment 3 is provided with a left-hand side door 7 in the left-hand side wall 5, a tailgate 7 in the rear side wall 5 and a right-hand side door 7 in the right-hand side wall 5.

The delivery van 1 is in the form of a delivery vehicle for conveying and delivering a plurality of objects 8 in the form of postal items. Accordingly, a plurality of objects 8 are arranged on the load surface 4 in the load compartment 3, as is clear from FIG. 1. The delivery van 1 has been loaded with the objects 8 at a logistics centre in order to deliver said objects to respective recipients along a predefined route.

In order to reduce the dead weight of the delivery van 1 in the form of an electric vehicle, no shelves are provided in the load compartment 3. Accordingly, all objects 8 are placed beside one another and/or above one another on the load surface 4. On account of inertial forces acting on the objects 8 as a result of starting or acceleration, during cornering and as a result of braking or stopping of the delivery van 1, the objects may slip on the load surface 4 and may change their position in the load compartment 3 during the journey.

This is illustrated, by way of example, in FIG. 2 which shows a schematic plan view of the delivery van 1 with its driver's cab 2 and load surface 4 in different situations. Beginning with the illustration on the far left, the situation immediately after the objects 8 have been deposited in the load compartment 3 is shown, following to the right of this is the situation during starting and acceleration of the delivery van 1, following to the right of this is the situation during a left turn of the delivery van 1, and following to the right of this, on the far right, is the situation when braking and stopping the delivery van. Of the total of eight objects 8 arranged in the load compartment 3, only the object 8' denoted with the reference sign 8' is considered below, wherein, for the sake of simplicity, it is assumed for the subsequent considerations that the remaining objects 8 do not change their position during the journey.

In the illustration on the far left, this object 8' has been placed on the load surface 4 of the load compartment 3 in an original position through the tailgate 7. Owing to starting and/or acceleration of the delivery van 1, this object 8' slides in the direction of the tailgate 7, as shown in the second illustration from the left and indicated with an arrow. A subsequent left turn causes the object 8' to slide in the direction of the right-hand side wall 5, illustrated in the third illustration from the left and indicated by an arrow. Subsequent braking and/or stopping of the delivery van 1 results in the object 8' sliding in the direction of the driver's cab 2, illustrated in the illustration on the far right and indicated by an arrow.

In comparison with the original position, illustrated on the far left in FIG. 2, the object 8' has assumed a different position in the load compartment 3 owing to acceleration or starting, a left turn and braking or stopping of the delivery van 1, as shown on the far right. If a delivery agent now wishes to remove the object 8' denoted with the reference sign 8' in FIG. 2 from the load compartment 3, the delivery agent no longer finds the object 8' at the original position and must search for the object 8' in a time-consuming manner: the delivery agent will first of all open the left-hand side door 7 of the load compartment 3 in the hope of finding the object 8 at its original position. Since the delivery agent cannot reach the object 8' through the left-hand side door 7, the delivery agent will search for the object 8 and will possibly also open the tailgate 7 for this purpose. Finally, the delivery agent will recognize that he can reach the object which is now on the right-hand side only through the right-hand side door 8 and can remove it from the load compartment 3.

In order to prevent the above-described unnecessary searching, a position determination device 9 in the form of a laser scanner is provided on a ceiling of the load compartment 3. The position determination device 9 captures the objects, on the one hand, during loading of the objects 8 into the load compartment 3 through the doors 7 and, on the other hand, when unloading the objects 8 through the doors 7 in terms of their size, their weight, their barcode and their volume and compares the information obtained in this manner with a loading list for the delivery van 1. For this purpose, the position determination device 9 is connected to a computer-based controller 10 which is arranged in the delivery van 1. On the basis of the sizes, weight, barcodes and volume captured from the objects 8, the position determination device 9 can track the respective current position of the individual objects 8 in the load compartment 3 during the journey of the delivery van 1 and can store the respective current position of the objects 8 in a database of the controller 10. For this purpose, the controller is provided with software or an algorithm for image processing in order to determine the respective current position of the objects 8 from the information obtained by the position determination device 9.

If the delivery agent would now like to remove one of the objects 8 which have been loaded into the load compartment 3, the current position of the object 8 to be removed and the door 7 to be opened for this purpose are indicated on an indication device 11 which is communicatively connected to the controller 10 and is in the form of a display 11. The indication device 11 can be integrated in a dashboard in the driver's cab 1 of the delivery van 1. One or a plurality of displays 11, on which the current position and the door to be opened are indicated, may likewise be provided on the outside of the load compartment 3 on the doors 7.

Starting from the respective current position of the objects 8, the controller 10 determines the respective door 7 from the plurality of doors 7 with the respective shortest distance to the respective current position of the respective object 8. The determined door 7 is presented on the indication device 11. In the case of indication devices 11 provided on the doors 7, these indication devices may likewise be in the form of lights, with the result that, in order to remove an object 8 from the load compartment 3, the light on the door 7 to be opened can be activated. The controller 10 may likewise be designed to cause the relevant door 7 to be opened. For this purpose, the doors 7 can be equipped with an electromechanical drive which is communicatively connected to the controller.

In principle, the determined door 7 and the current position of the object 8 to be removed by the delivery agent in the load compartment 3 can be indicated by an acoustic, haptic and/or visual signal. The objects 8 loaded into the load compartment 3 can be presented on the abovementioned display as bounding volumes, wherein the object 8 to be removed is presented in a different colour or with hatching for easier findability.

The determined door 7 and the current position of the object 8 to be removed may likewise be presented on a mobile communication device 12 belonging to the delivery agent, which communication device is communicatively connected to the controller 10.

The mobile communication device 12 may be in the form of a smartphone or a mobile terminal for scanning the objects 8 when loading and unloading the latter. The position determination device 9 and the indication device 11 may likewise be in one piece in the form of a laser scanner which is arranged on the ceiling of the load compartment 3 and can be used to present the current position of the at least one object 8 by projecting a laser beam and/or an envelope curve.

As a result, the delivery van 1 and a corresponding method provide a simple possible way of easily and quickly finding objects 8 in the load compartment 3 without unnecessary searching.

The described exemplary embodiments are merely examples which can be modified and/or supplemented in various ways within the scope of the claims. Any feature which has been described for a particular exemplary embodiment can be used independently or in combination with other features in any desired other exemplary embodiment. Any feature which has been described for an exemplary embodiment of a particular category can also be accordingly used in an exemplary embodiment of another category.

LIST OF REFERENCE SIGNS

Delivery van 1
Driver's cab 2
Load compartment 3
Load surface 4
Side wall 5
Ceiling wall 6
Door 7

Object 8
Position determination device 9
Controller 10
Indication device, display 11
Mobile communication device 12

The invention claimed is:

1. A method for locating at least one object transported in a load compartment of a delivery van, the load compartment having a plurality of doors for removing the at least one object from the load compartment, the delivery van having a controller, the method comprising:
loading the at least one object into the load compartment of the delivery van;
determining a current position of the at least one object in the load compartment of the delivery van with a position determination device communicatively connected to the controller;
tracking the current position of the at least one object in the load compartment during a journey with the position determination device communicatively connected to the controller, while the current position of the at least one object in the load compartment changes due to starting, acceleration, cornering, braking, and/or stopping of the delivery van during the journey;
for removing the at least one object from the load compartment, determining that door from the plurality of doors with the shortest distance to the current position of the at least one object;
indicating the determined door with an indication device communicatively connected to the controller;
opening the determined door; and
indicating the current position of the at least one object in the load compartment with the indication device.

2. The method according to claim 1, further comprising:
loading the load compartment with a plurality of objects; and
determining the current position of all objects in the load compartment during the journey of the delivery van with the position determination device communicatively connected to the controller.

3. The method according to claim 1, wherein the indication of the determined door and/or the indication of the current position of the at least one object in the load compartment comprises one or more of:
an acoustic, haptic and/or visual signal;
a presentation on a display of the delivery van and/or of a mobile communication device; and
a presentation of the current position of the at least one object and/or of the door by projecting a laser beam onto the at least one object and/or the door.

4. The method according claim 1, wherein the indication of the current position of the at least one object in the load compartment comprises a presentation of a bounding volume around the at least one object.

5. The method according to claim 1, wherein the plurality of doors comprise a left-hand side door, a right-hand side door and/or a tailgate of the load compartment.

6. The method according to claim 1, wherein the position determination device comprises a camera and/or a laser scanner.

7. The method according to claim 1, wherein the position determination device is configured to determine an identification data record of the at least one object.

8. The method according to claim 1, wherein the load compartment is designed without shelves.

9. The method according to claim 1, wherein the delivery van is an electric vehicle and/or does not have an internal combustion engine.

10. A delivery van having a load compartment for transporting at least one object, the delivery van comprising:
a controller;
a position determination device which is communicatively connected to the controller and is configured to determine a current position of the at least one object in the load compartment; and
an indication device communicatively connected to the controller,
wherein the load compartment has a plurality of doors for removing the objects from the load compartment,
wherein the controller is configured for tracking the current position of the at least one object in the load compartment during a journey with the position determination device communicatively connected to the controller, while the current position of the at least one object in the load compartment changes due to starting, acceleration, cornering, braking, and/or stopping of the delivery van during the journey,
wherein the controller, for removing the at least one object from the load compartment, is configured to determine that door from the plurality of doors with the shortest distance to the current position of the at least one object, to control the indication device to indicate the determined door, to cause opening of the determined door, and to control the indication device to indicate the current position of the at least one object in the load compartment.

11. The delivery van according to claim 10, wherein the indication of the determined door and/or the indication of the current position of the at least one object in the load compartment comprises one or more of:
an acoustic, haptic and/or visual signal;
a presentation on a display of the delivery van and/or of a mobile communication device; and
a presentation of the current position of the at least one object and/or of the door by projecting a laser beam onto the at least one object and/or the door.

12. The delivery van according to claim 10, wherein the indication of the current position of the at least one object in the load compartment comprises a presentation of a bounding volume around the at least one object.

13. The delivery van according to claim 10, wherein the plurality of doors comprises a left-hand side door, a right-hand side door and/or a tailgate of the load compartment.

14. The delivery van according to claim 10, wherein the position determination device comprises a camera and/or a laser scanner.

15. The delivery van according to claim 10, wherein the position determination device is configured to determine an identification data record of the at least one object.

16. The delivery van according to claim 10, wherein the load compartment is designed without shelves.

17. The delivery van according to claim 10, wherein the delivery van is an electric vehicle and/or does not have an internal combustion engine.

* * * * *